US012646648B2

(12) United States Patent
Luo

(10) Patent No.: US 12,646,648 B2
(45) Date of Patent: Jun. 2, 2026

(54) INDUCTOR DEVICE

(71) Applicant: Realtek Semiconductor Corporation, Hsinchu (TW)

(72) Inventor: Cheng-Wei Luo, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 931 days.

(21) Appl. No.: 17/932,306

(22) Filed: Sep. 15, 2022

(65) Prior Publication Data

US 2023/0154670 A1 May 18, 2023

(30) Foreign Application Priority Data

Nov. 17, 2021 (TW) ................................ 110142759

(51) Int. Cl.
*H01F 27/30* (2006.01)

(52) U.S. Cl.
CPC .................................. *H01F 27/306* (2013.01)

(58) Field of Classification Search
CPC ........... H01F 27/306; H01F 2017/0046; H01F 17/0013; H01F 2017/0073
USPC .......................................... 336/82, 200, 232
See application file for complete search history.

(56) References Cited

U.S. PATENT DOCUMENTS 7,312,685 B1 * 12/2007 Lee ..................... H01F 17/0013 336/200
9,111,676 B2 8/2015 Ler et al.
2004/0017278 A1 * 1/2004 Castaneda ........... H01F 17/0006 336/200
2004/0075521 A1 4/2004 Yu et al.
2005/0104706 A1 * 5/2005 Chou .................. H01F 27/2804 336/200
2015/0310980 A1 * 10/2015 Yen ........................... H01F 5/00 336/200
2018/0366254 A1 * 12/2018 Yen ..................... H01F 27/2804
2019/0043653 A1 * 2/2019 Dai ....................... H01F 27/306
2019/0221350 A1 * 7/2019 Yen .......................... H10D 1/20

FOREIGN PATENT DOCUMENTS

CN 104517941 A 4/2015
TW I692782 B 5/2020

* cited by examiner

*Primary Examiner* — Shawki S Ismail
*Assistant Examiner* — Kazi S Hossain
(74) *Attorney, Agent, or Firm* — CKC & Partners Co., LLC

(57) ABSTRACT

An inductor device includes a first winding, a second winding, a first connecting structure and a second connecting structure. The first winding includes a first coil and a second coil. The second winding includes a third coil and a fourth coil, the third coil is overlapped with the first coil, and the fourth coil is overlapped with the second coil. The first connecting structure includes a first crossing structure and a second crossing structure. The first crossing structure has a first crossing point and is configured to couple the first coil and the second coil. The second crossing structure has a second crossing point and is configured to couple the third coil and the fourth coil. The first crossing point is not overlapped with the second crossing point. The second connecting structure is configured to couple the second coil and the third coil.

19 Claims, 7 Drawing Sheets

Fig. 3
UP2
UP4
UP6
UP8
DP2
DP4
DP6
DP8
Cp
UP7
UP5
UP3
UP1
DP7
DP5
DP3
DP1

INDUCTOR DEVICE

CROSS-REFERENCE TO RELATED APPLICATION

This application claims priority to Taiwan Application Serial Number 110142759, filed Nov. 17, 2021, which is herein incorporated by reference in its entirety.

BACKGROUND

Field of Invention

This disclosure relates to an electronic device, and in particular to an inductor device.

Description of Related Art

Various types of existing inductors have their own advantages and disadvantages. For a symmetrical differential inductor, its parasitic capacitance is large, which results in a low self-resonance frequency and a low quality factor. Therefore, the application range of the aforementioned inductor is limited.

SUMMARY

An aspect of present disclosure relates to an inductor device. The inductor device includes a first winding in a first metal layer, a second winding in a second metal layer, a first connecting structure and a second connecting structure. The first winding includes a first coil and a second coil. The second winding includes a third coil and a fourth coil, the third coil is overlapped with the first coil in a direction perpendicular to the first coil, and the fourth coil is overlapped with the second coil in a direction perpendicular to the second coil. The first connecting structure includes a first crossing structure and a second crossing structure. The first crossing structure has a first crossing point and is configured to couple the first coil and the second coil. The second crossing structure has a second crossing point and is configured to couple the third coil and the fourth coil. The first crossing point is not overlapped with the second crossing point. The second connecting structure is configured to couple the second coil and the third coil.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms “coupled” or “connected” as used herein may mean that two or more elements are directly in physical or electrical contact, or are indirectly in physical or electrical contact with each other. It can also mean that two or more elements interact with each other.

Figure 1:
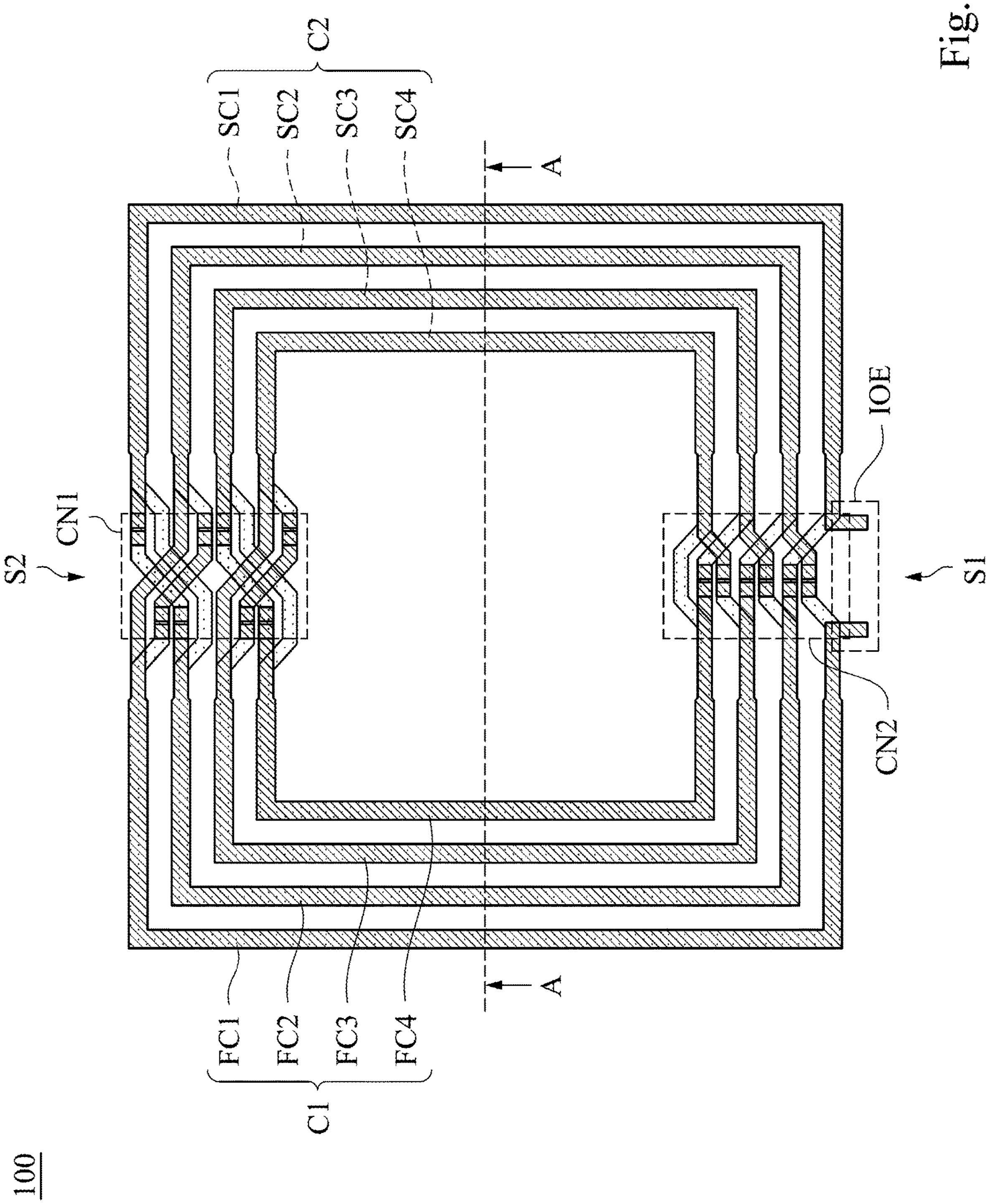
FIG. 1 is a schematic diagram of an inductor device in accordance with some embodiments of the present disclosure.

Referring to FIG. 1, FIG. 1 a schematic diagram of an inductor device 100 in accordance with some embodiments of the present disclosure. The inductor device 100 includes a first winding C1, a second winding C2, a first connecting structure CN1, a second connecting structure CN2 and an input-output terminal IOE. In some embodiments, the first winding C1 and the second winding C2 are overlapped with each other via a configuration of the first connecting structure CN1 and the second connecting structure CN2. It can be appreciated that the terms “overlapped” as used herein refer to substantial overlapping or actual overlapping.

In particular, the second connecting structure CN2 and the input-output terminal IOE are on a first side S1 of the inductor device 100, and the first connecting structure CN1 is on a second side S2 of the inductor device 100. As shown in FIG. 1, the first side S1 (e.g., a lower side) and the second side S2 (e.g., an upper side) are two opposite sides.

Figure 2A:
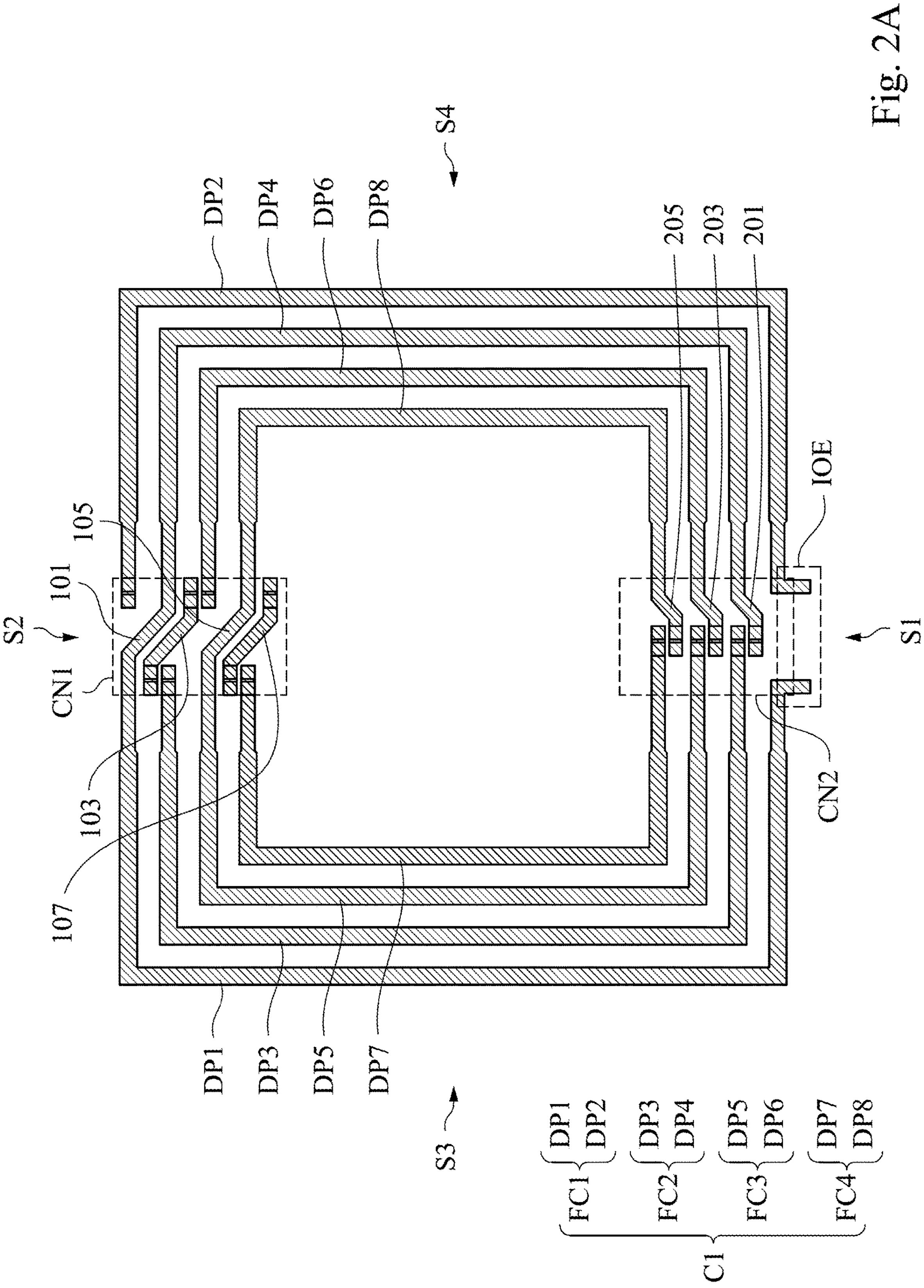
FIG. 2A is a schematic diagram of partial structure of the inductor device of FIG. 1 in accordance with some embodiments of the present disclosure.
Figure 2B:
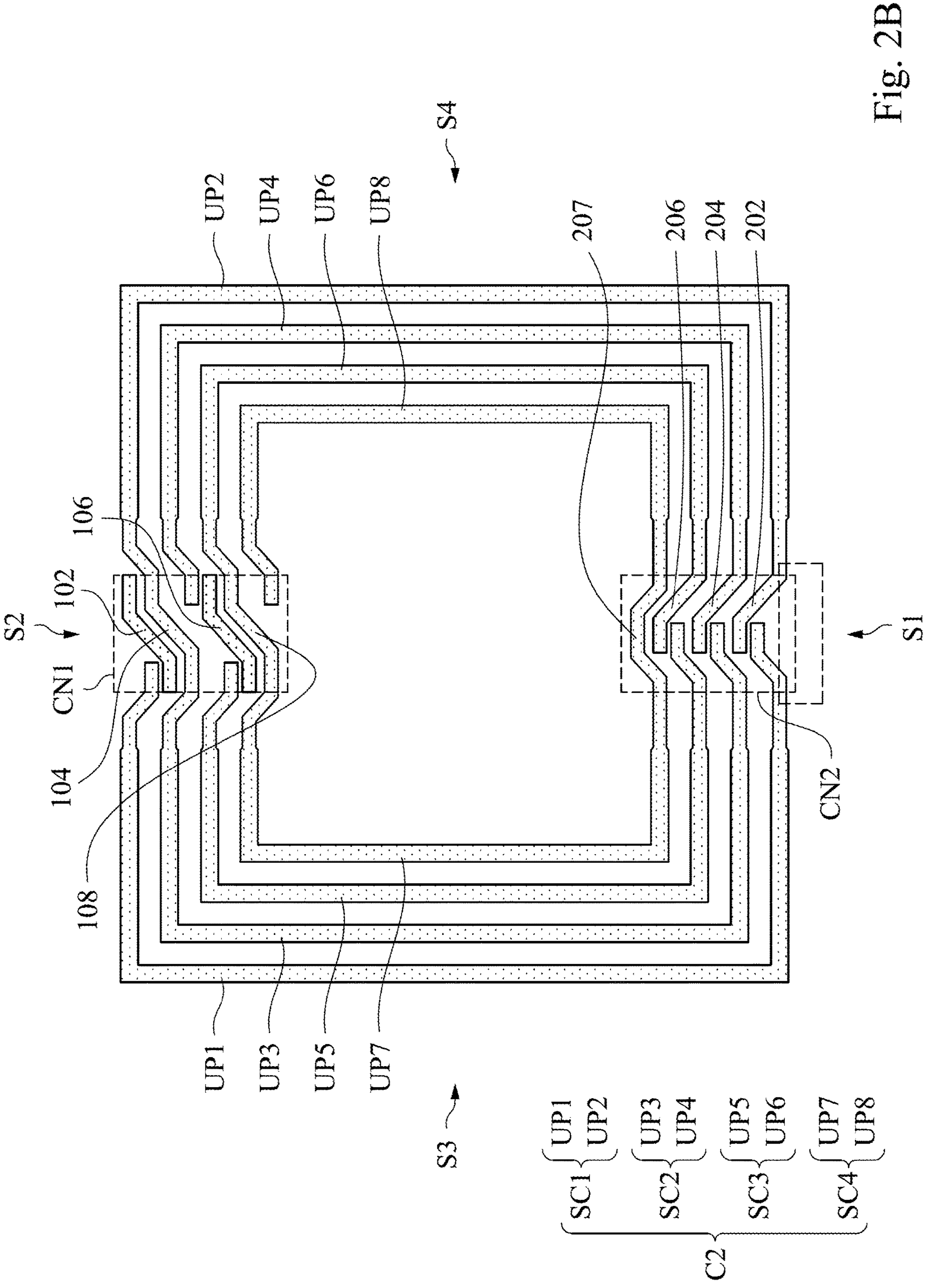
FIG. 2B is a schematic diagram of partial structure of the inductor device of FIG. 1 in accordance with some embodiments of the present disclosure.

For easily understanding, the structure of the inductor device 100 would be described in following paragraphs with reference to FIGS. 2A and 2B. Referring to FIGS. 2A and 2B, FIG. 2A is a schematic diagram of a structure of the inductor device 100 in a first metal layer in accordance with some embodiments of the present disclosure, and FIG. 2B is a schematic diagram of a structure of the inductor device 100 in a second metal layer in accordance with some embodiments of the present disclosure. In some embodiments, the first metal layer is a lower layer, the second metal layer is an upper layer, but the present disclosure is not limited herein.

It can be appreciated that the structure of the inductor device 100 in the first metal layer is represented as inclined line grids in FIGS. 1 and 2A, and the structure of the inductor device 100 in the second metal layer is represented as dot grids in FIGS. 1 and 2B.

As shown in FIG. 2A, the first winding C1 is in the first metal layer, and the first winding C1 is configured with a plurality of coils FC1-FC4 from outside to inside. The coil FC1 includes a half coil DP1 and a half coil DP2, and the half coil DP1 and the half coil DP2 are symmetrically configured in the first metal layer to substantially present a square. In particular, the half coil DP1 is on a third side S3 of the inductor device 100, and the half coil DP2 is on a fourth side S4 of the inductor device 100. The third side S3 (e.g., a left side) and the fourth side S4 (e.g., a right side) are two opposite sides. The structures of other coils FC2-FC4 can be deduced by analogy, and therefore the descriptions thereof are omitted herein.

As shown in FIG. 2B, the second winding C2 is in the second metal layer different from the first metal layer, and the second winding C2 is also configured with a plurality of coils SC1-SC4 from outside to inside. The coil SC1 includes a half coil UP1 and a half coil UP2, and the half coil UP1 and the half coil UP2 are symmetrically configured in the second metal layer to substantially present a square. In particular, the half coil UP1 is on the third side S3 of the inductor device 100 and is overlapped with the half coil DP1 in a direction perpendicular to the half coil DP1. The half coil UP2 is on the fourth side S4 of the inductor device 100 and is overlapped with the half coil DP2 in a direction perpendicular to the half coil DP2. In other words, the coil SC1 of the second winding C2 is overlapped with the coil FC1 of the first winding C1 in a direction perpendicular to the coil FC1 of the first winding C1. The structures of other coils SC2-SC4 can be deduced by analogy, and therefore the descriptions thereof are omitted herein.

As shown in FIGS. 2A and 2B, the first connecting structure CN1 includes a plurality of connecting members 101, 103, 105 and 107 which are in the first metal layer and a plurality of connecting members 102, 104, 106 and 108 which are in the second metal layer. The second connecting structure CN2 includes a plurality of connecting members 201, 203 and 205 which are in the first metal layer and a plurality of connecting members 202, 204, 206 and 207 which are in the second metal layer.

In detail, the half coil DP2 of the first winding C1 is directly coupled to the input-output terminal IOE on the first side S1 and is coupled to one terminal of the connecting member 102 through a via on the second side S2. The other terminal of the connecting member 102 is coupled to the half coil DP3 of the first winding C1 through a via. That is, the half coil DP2 in the first metal layer is coupled to the half coil DP3 in the first metal layer through the connecting member 102 in the second metal layer.

The half coil DP3 is coupled to one terminal of the connecting member 202 through a via on the first side S1. The other terminal of the connecting member 202 is directly coupled to the half coil UP2 of the second winding C2. That is, the half coil DP3 in the first metal layer is coupled to the half coil UP2 in the second metal layer through the connecting member 202 in the second metal layer.

The half coil UP2 is directly coupled to one terminal of the connecting member 104 on the second side S2. The other terminal of the connecting member 104 is directly coupled to the half coil UP3 of the second winding C2. That is, the half coil UP2 in the second metal layer is coupled to the half coil UP3 in the second metal layer through the connecting member 104 in the second metal layer.

The half coil UP3 is coupled to one terminal of the connecting member 203 through a via on the first side S1. The other terminal of the connecting member 203 is directly coupled to the half coil DP6 of the first winding C1. That is, the half coil UP3 in the second metal layer is coupled to the half coil DP6 in the first metal layer through the connecting member 203 in the first metal layer.

The half coil DP6 is coupled to one terminal of the connecting member 106 through a via on the second side S2. The other terminal of the connecting member 106 is coupled to the half coil DP7 of the first winding C1 through a via. That is, the half coil DP6 in the first metal layer is coupled to the half coil DP7 in the first metal layer through the connecting member 106 in the second metal layer.

The half coil DP7 is coupled to one terminal of the connecting member 206 through a via on the first side S1. The other terminal of the connecting member 206 is directly coupled to the half coil UP6 of the second winding C2. That is, the half coil DP7 in the first metal layer is coupled to the half coil UP6 in the second metal layer through the connecting member 206 in the second metal layer.

The half coil UP6 is directly coupled to one terminal of the connecting member 108 on the second side S2. The other terminal of the connecting member 108 is directly coupled to the half coil UP7 of the second winding C2. That is, the half coil UP6 in the second metal layer is coupled to the half coil UP7 in the second metal layer through the connecting member 108 in the second metal layer.

The half coil UP7 is directly coupled to one terminal of the connecting member 207 on the first side S1. The other terminal of the connecting member 207 is directly coupled to the half coil UP8 of the second winding C2. That is, the half coil UP7 in the second metal layer is coupled to the half coil UP8 in the second metal layer through the connecting member 207 in the second metal layer. In some embodiments, a central tap terminal (not shown) can be configured on the connecting member 207.

The half coil UP8 is coupled to one terminal of the connecting member 107 through a via on the second side S2. The other terminal of the connecting member 107 is coupled to the half coil UP5 of the second winding C2 through a via. That is, the half coil UP8 in the second metal layer is coupled to the half coil UP5 in the second metal layer through the connecting member 107 in the first metal layer.

The half coil UP5 is coupled to one terminal of the connecting member 205 through a via on the first side S1. The other terminal of the connecting member 205 is directly coupled to the half coil DP8 of the first winding C1. That is, the half coil UP5 in the second metal layer is coupled to the half coil DP8 in the first metal layer through the connecting member 205 in the first metal layer.

The half coil DP8 is directly coupled to one terminal of the connecting member 105 on the second side S2. The other terminal of the connecting member 105 is directly coupled to the half coil DP5 of the first winding C1. That is, the half coil DP8 in the first metal layer is coupled to the half coil DP5 in the first metal layer through the connecting member 105 in the first metal layer.

The half coil DP5 is coupled to one terminal of the connecting member 204 through a via on the first side S1. The other terminal of the connecting member 204 is directly coupled to the half coil UP4 of the second winding C2. That is, the half coil DP5 in the first metal layer is coupled to the half coil UP4 in the second metal layer through the connecting member 204 in the second metal layer.

The half coil UP4 is coupled to one terminal of the connecting member 103 through a via on the second side S2. The other terminal of the connecting member 103 is coupled to the half coil UP1 of the second winding C2 through a via. That is, the half coil UP4 in the second metal layer is coupled to the half coil UP1 in the second metal layer through the connecting member 103 in the first metal layer.

The half coil UP1 is coupled to one terminal of the connecting member 201 through a via on the first side S1. The other terminal of the connecting member 201 is directly coupled to the half coil DP4 of the first winding C1. That is, the half coil UP1 in the second metal layer is coupled to the half coil DP4 in the first metal layer through the connecting member 201 in the first metal layer.

The half coil DP4 is directly coupled to one terminal of the connecting member 101 on the second side S2. The other terminal of the connecting member 101 is directly coupled to the half coil DP1 of the first winding C1. That is, the half coil DP4 in the first metal layer is coupled to the half coil DP1 in the first metal layer through the connecting member 101 in the first metal layer. In addition, the half coil DP1 is directly coupled to the input-output terminal IOE on the first side S1.

It can be seen from above descriptions that the first connecting structure CN1 is configured to couple the coils in the same metal layer, and that the second connecting structure CN2 is configured to couple the coils in the different layers.

In some embodiments, the input-output terminal IOE is configured to input or output signal. It can be seen from the structure of the inductor device 100 that two half coils overlapped with each other can transmit signals with same polarity (e.g., same positive polarity signals or same negative polarity signals). For example, the signal transmitted by the half coil DP1 of the first winding C1 and the signal transmitted by the half coil UP1 of the second winding C2 have same polarity. The arrangements of other half coils DP2-DP8 and UP2-UP8 can be deduced by analogy, and therefore the descriptions thereof are omitted herein.

Two half coils which are on the same side and are separated by one half coil can transmit signals with same polarity (e.g., same positive polarity signals or same negative polarity signals), and two adjacent half coils which are on the same side can transmit signals with different polarities (e.g., one is positive polarity signal, and another one is negative polarity signal). For example, the signal transmitted by the half coil DP1 of the first winding C1 has same polarity as the signal transmitted by the half coil DP5 of the first winding C1, but has different polarity from the signal transmitted by the half coil DP3 of the first winding C1. The arrangements of other half coils DP2, DP4, DP6-DP8 and UP1-UP8 can be deduced by analogy, and therefore the descriptions thereof are omitted herein.

It can be further appreciated that two half coils of the same coil can transmit signals with different polarities (e.g., one is positive polarity signal, and another one is negative polarity signal). For example, the signal transmitted by the half coil DP1 of the first winding C1 has different polarity from the signal transmitted by the half coil DP2 of the first winding C1. The arrangements of other half coils DP3-DP8 and UP1-UP8 can be deduced by analogy, and therefore the descriptions thereof are omitted herein.

Accordingly, in the embodiments of FIGS. 2A and 2B, the half coils DP2, DP3, UP2, UP3, DP6, DP7, UP6 and UP7 are configured to transmit a first polarity signal (not shown), and the half coils DP1, DP4, UP1, UP4, DP5, DP8, UP5 and UP8 are configured to transmit a second polarity signal (not shown) different from the first polarity signal. For convenience of understanding, the transmission of first polarity signal and the second polarity signal in the inductor device 100 would be described in following paragraphs with reference to FIG. 3.

Figure 3:
FIG. 3 is a schematic diagram of a cross-section of the inductor device along a virtual line A-A in FIG. 1 in accordance with some embodiments of the present disclosure.

Referring to FIG. 3, FIG. 3 is a schematic diagram of a cross-section of the inductor device 100 along a virtual line A-A in FIG. 1 in accordance with some embodiments of the present disclosure. In the embodiment of FIG. 3, the first polarity signal transmitted in the half coils DP2, DP3, UP2, UP3, DP6, DP7, UP6 and UP7 is a negative polarity signal, and the second polarity signal transmitted in the half coils DP1, DP4, UP1, UP4, DP5, DP8, UP5 and UP8 is a positive polarity signal. It can be seen from the distribution of polarity as shown in FIG. 3 that the parasitic capacitors Cp are mostly formed between two adjacent half coils in the same layer (e.g., the half coil DP1 and the half coil DP3). It can be appreciated that the number and the position of the parasitic capacitors Cp are not limited to those of FIG. 3. For example, the parasitic capacitor might be formed between the half coil DP1 and the half coil UP3 which are in the different layers, however, the capacitance thereof might be much smaller than the capacitance of the parasitic capacitor Cp between the half coil DP1 and the half coil DP3. Since the distance between the half coils (e.g., the half coil DP1 and the half coil DP3) which are responsible for transmitting signals with different polarities in the inductor device 100 is increased, the capacitance of each parasitic capacitor Cp is reduced, so that the equivalent parasitic capacitance of the inductor device 100 can be reduced dramatically. In some embodiments, the equivalent parasitic capacitance of the inductor device 100 is 125 fF, which is reduced by 83% in comparison to the prior art.

Figure 4:
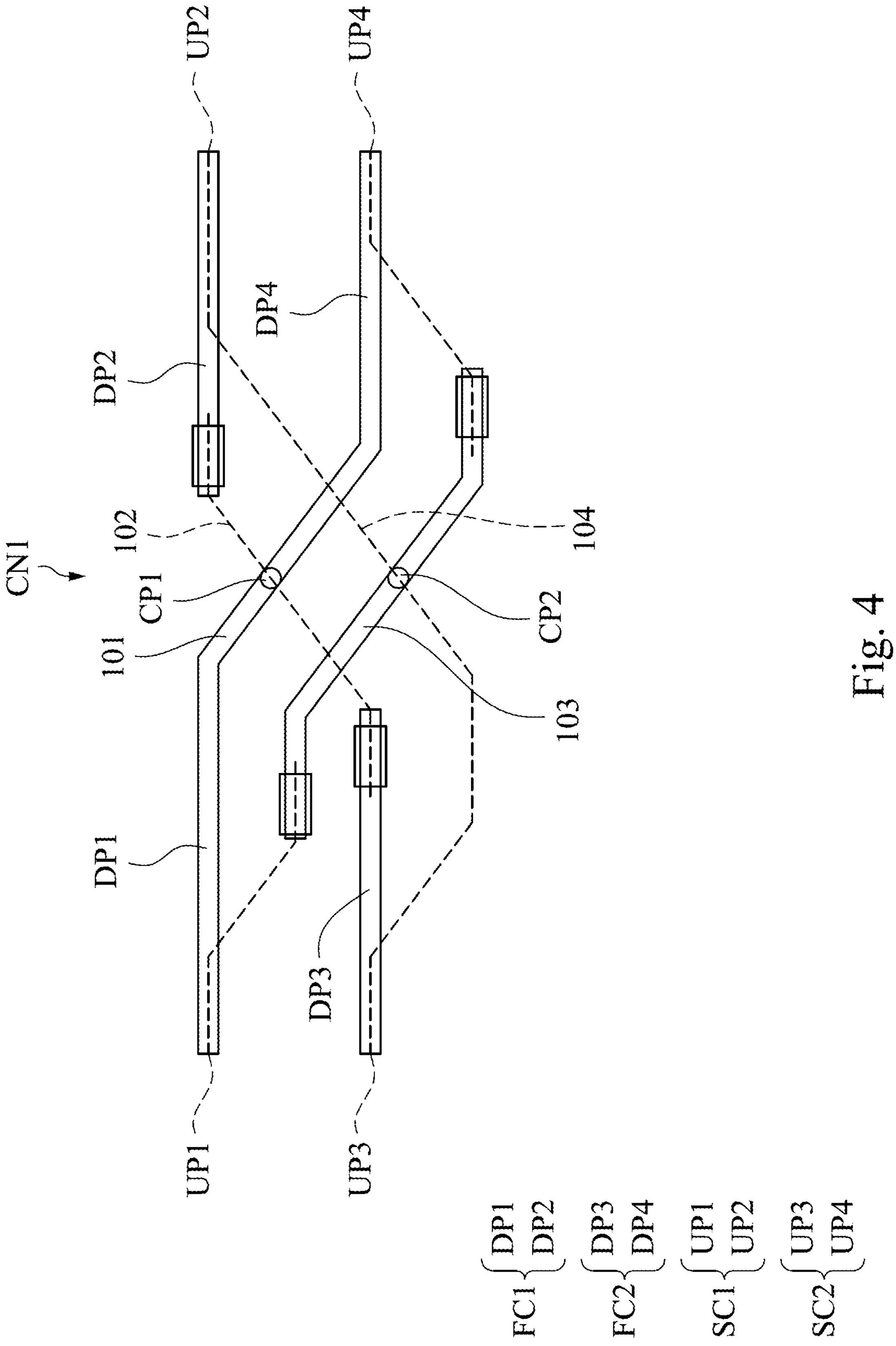
FIG. 4 is a schematic diagram of partial structure of a first connecting structure in accordance with some embodiments of the present disclosure.

Referring to FIG. 4, FIG. 4 is a schematic diagram of partial structure of the first connecting structure CN1 in accordance with some embodiments of the present disclosure. The symbol of FIG. 4 which is same as those of FIG. 1, 2A or 2B represents same or similar component, and therefore the description thereof is omitted herein. In the first connecting structure CN1, the connecting member 101 in the first metal layer is intersected with the connecting member 102 in the second metal layer to constitute a first crossing structure. The connecting member 103 in the first metal layer is intersected with the connecting member 104 in the second metal layer to constitute a second crossing structure. As shown in FIG. 4, the first crossing structure has a first crossing point CP1, the second crossing structure has a second crossing point CP2, and the first crossing point CP1 and the second crossing point CP2 are not overlapped. In other words, the first crossing structure and the second crossing structure are not overlapped.

Notably, by the first crossing structure and the second crossing structure which are not overlapped, the couple of the coils FC1 and FC2 and the couple of the coils SC1 and SC2 can be implemented without a connecting member in a third layer (which is different from the first and the second layers).

As shown in FIG. 4 again, the connecting member 103 in the first metal layer is intersected with the connecting member 102 in the second metal layer, and is not overlapped with the connecting member 101 in the first metal layer. In addition, the connecting member 104 in the second metal layer is intersected with the connecting member 101 in the first metal layer, and is not overlapped with the connecting member 102 in the second metal layer.

Figure 5:
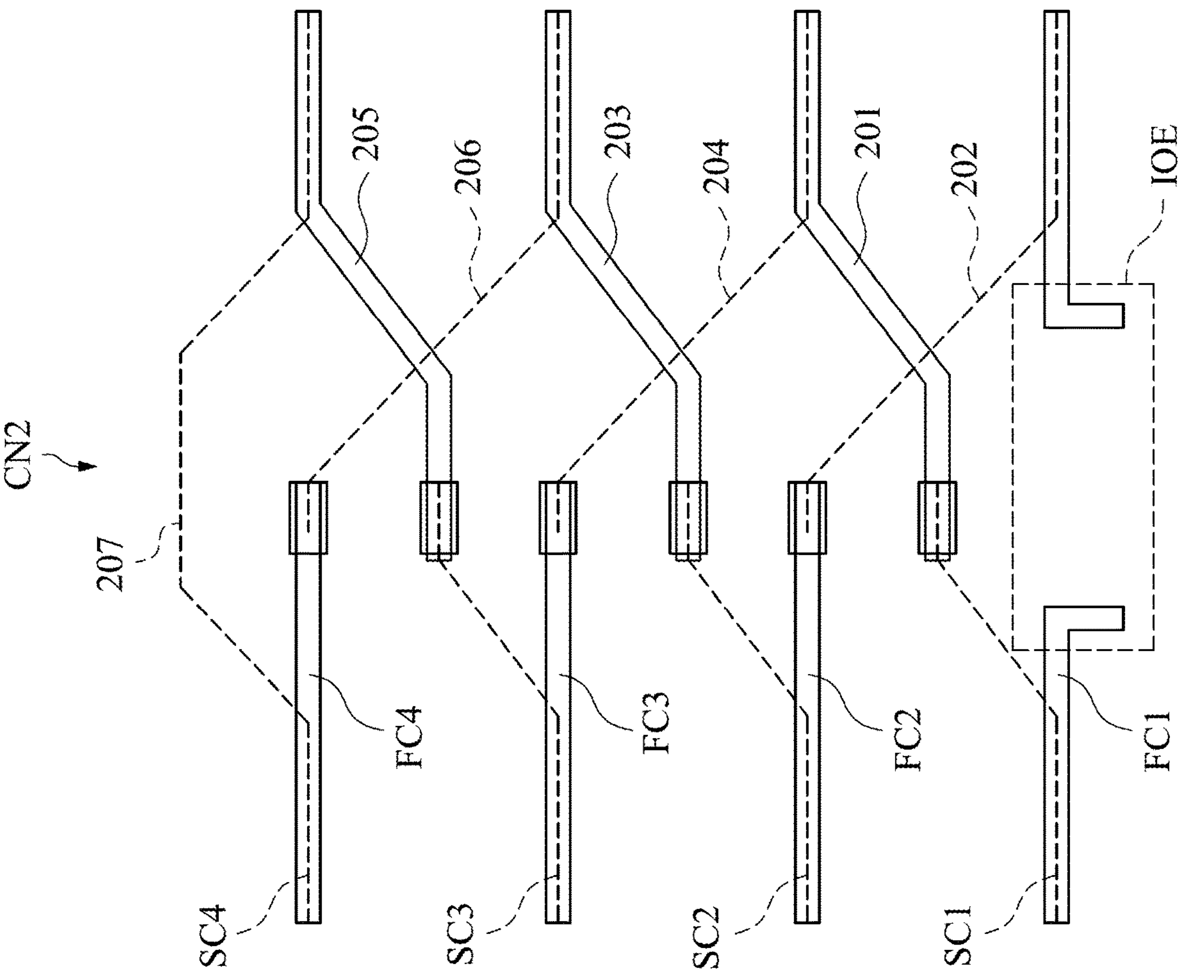
FIG. 5 is a schematic diagram of partial structure of a second connecting structure in accordance with some embodiments of the present disclosure.

Referring to FIG. 5, FIG. 5 is a schematic diagram of partial structure of the second connecting structure CN2 in accordance with some embodiments of the present disclosure. In the second connecting structure CN2, the connecting member 201 is intersected with the connecting member 202, the connecting member 203 is intersected with the connecting member 204, the connecting member 205 is intersected with the connecting member 206, and the connecting member 207 is not overlapped with the connecting members 201-206.

In some embodiments, the first metal layer is an ultra-thick metal (UTM) layer, the second metal layer is aluminum redistribution layer (AL-RDL), and the thickness of the second metal layer is smaller than the thickness of the first metal layer. It can be appreciated that the present disclosure is not limited herein.

In the aforementioned embodiments, the inductor 100 has a square structure (i.e., a quadrilateral structure). It can be appreciated that the inductor device can also be other polygonal structure in other embodiments. In addition, it can be appreciated that the number of the coils of the first winding C1 and the number of the coils of the second winding C2 are only for example, and the present disclosure is not limited to the number as shown in the drawings.

Figure 6:
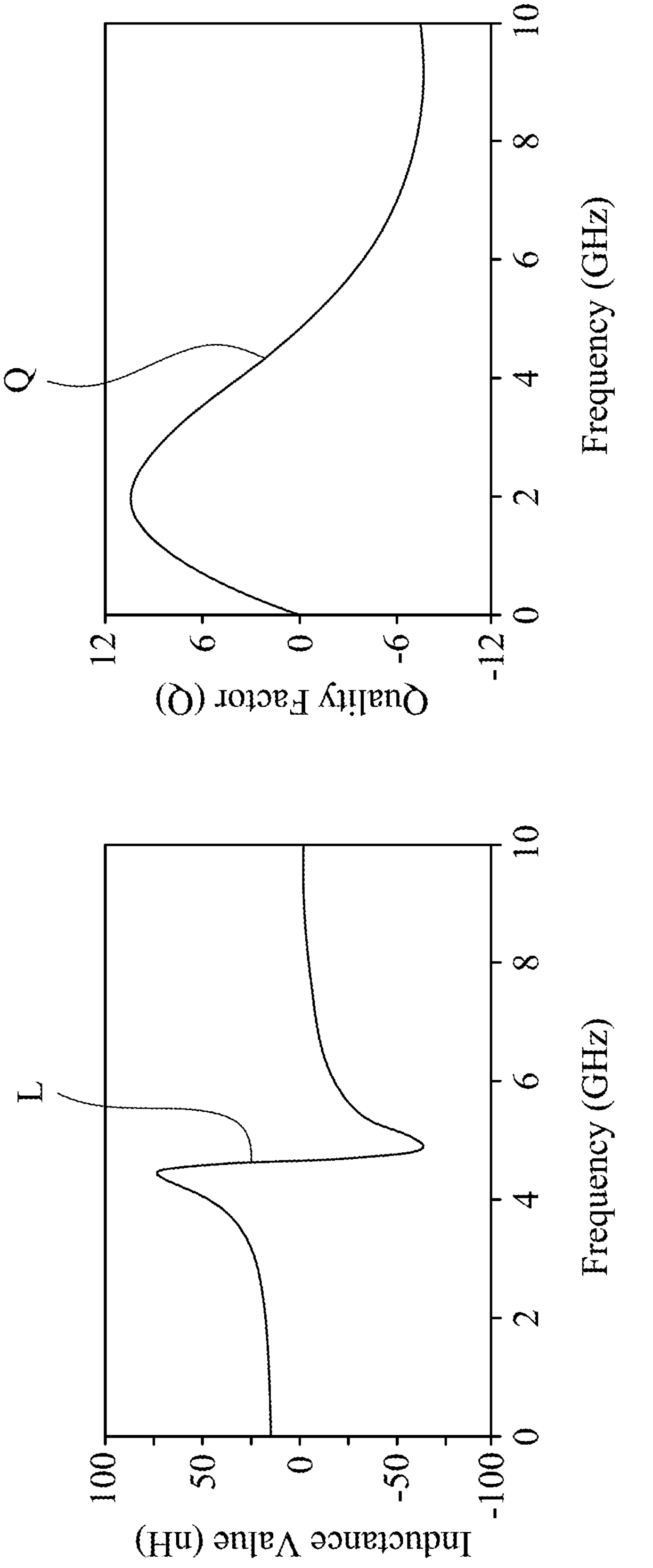
FIG. 6 is a schematic diagram of experimental data of the inductor device in accordance with some embodiments of the present disclosure.

Referring to FIG. 6, FIG. 6 is a schematic diagram of experimental data of the inductor device 100 in accordance with some embodiments of the present disclosure. As shown in FIG. 6, by adopting the structural configuration of the present disclosure, the experimental curve of the quality factor of the inductor device is Q, and the experimental curve of the inductance value of the inductor device is L. In comparison to the prior art, the inductor device 100 adopting the structure of the present disclosure has better quality factor and inductance value. For example, the quality factor (Q) of the inductor device 100 is about 10.97 at the working frequency 2 GHz, which is increased by 5% in comparison to the prior art. In addition, the self-resonance frequency (Fsr) of the inductor device 100 is about 4.9 GHz, which is increased by 88% in comparison to the prior art. Since the working frequency of 2 GHz of the inductor device 100 is away from the self-resonance frequency of 4.9 GHz of the inductor device 100, the inductance value of the inductor device 100 is more stable at the working frequency of 2 GHz (that is, the inductance value of the inductor device 100 changes less obviously in the range centered at the working frequency of 2 GHz).

It can be seen from the above embodiments of the present disclosure that the inductor device 100 of the present disclosure has the advantage of reduced equivalent parasitic capacitance by stacked structure (that is, the first winding C1 and the second winding C2 are substantially overlapped with each other). In addition, the inductor device 100 can further increase the self-resonance frequency and the quality factor by the structure of the present disclosure.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. An inductor device, comprising:

a first winding in a first metal layer, wherein the first winding comprises a first coil and a second coil;

a second winding in a second metal layer, wherein the second winding comprises a third coil and a fourth coil, the third coil is overlapped with the first coil vertically, and the fourth coil is overlapped with the second coil vertically;

a first connecting structure comprising:

a first crossing structure having a first crossing point and configured to directly couple the first coil and the second coil; and a second crossing structure having a second crossing point and configured to directly couple the third coil and the fourth coil, wherein the first crossing point is not overlapped with the second crossing point; and a second connecting structure configured to couple the second coil and the third coil, wherein the second connecting structure comprises a fifth connecting member in the first metal layer, and the fifth connecting member is configured to couple the second coil and the third coil.

2. The inductor device of claim 1, wherein the first crossing structure comprises a first connecting member in the first metal layer, and the first connecting member is configured to couple the first coil and the second coil.

3. The inductor device of claim 2, wherein the first crossing structure further comprises a second connecting member in the second metal layer, and the second connecting member is configured to couple the first coil and the second coil, wherein the first connecting member is intersected with the second connecting member to form the first crossing point.

4. The inductor device of claim 3, wherein the second crossing structure comprises a third connecting member in the first metal layer, and the third connecting member is configured to couple the third coil and the fourth coil, wherein the third connecting member is intersected with the second connecting member, and the third connecting member is not overlapped with the first connecting member.

5. The inductor device of claim 4, wherein the second crossing structure further comprises a fourth connecting member in the second metal layer, and the fourth connecting member is configured to couple the third coil and the fourth coil, wherein the fourth connecting member is intersected with the third connecting member to form the second crossing point, wherein the fourth connecting member is intersected with the first connecting member, and the fourth connecting member is not overlapped with the second connecting member.

6. The inductor device of claim 1, wherein the second connecting structure further comprises a sixth connecting member in the second metal layer, the sixth connecting member is configured to couple the second coil and the third coil, and the fifth connecting member is intersected with the sixth connecting member.

7. The inductor device of claim 6, wherein the second connecting structure further comprises a seventh connecting member in the second metal layer, the second winding further comprises a plurality of coils, the seventh connecting member is configured to couple an innermost coil of the second winding, and the seventh connecting member is not overlapped with the fifth connecting member and the sixth connecting member.

8. The inductor device of claim 1, wherein the first coil is located outside the second coil, and the third coil is located outside the fourth coil.

9. The inductor device of claim 1, wherein the first winding further comprises a plurality of coils, and the inductor device further comprises:

an input-output terminal configured to couple a outermost coil of the first winding, wherein the input-output terminal and the second connecting structure are located on a first side of the inductor device.

10. The inductor device of claim 9, wherein the first connecting structure is located on a second side of the inductor device, and the first side is different from the second side.

11. An inductor device, comprising:

a first winding in a first metal layer, wherein the first winding comprises a first coil and a second coil;

a second winding in a second metal layer, wherein the second winding comprises a third coil and a fourth coil, the third coil is overlapped with the first coil vertically, and the fourth coil is overlapped with the second coil vertically;

a first connecting structure comprising:

a first crossing structure having a first crossing point and configured to directly couple the first coil and the second coil; and a second crossing structure having a second crossing point and configured to directly couple the third coil and the fourth coil, wherein the first crossing point is not overlapped with the second crossing point; and a second connecting structure configured to couple the second coil and the third coil;

wherein the first winding further comprises a plurality of coils, and the inductor device further comprises:

an input-output terminal configured to couple a outermost coil of the first winding, wherein the input-output terminal and the second connecting structure are located on a first side of the inductor device, the first connecting structure is located on a second side of the inductor device, and the first side is different from the second side;

wherein the first coil comprises a first half coil and a second half coil, the second coil comprises a third half coil and a fourth half coil, the first half coil and the third half coil are located on a third side of the inductor device, the second half coil and the fourth half coil are located on a fourth side of the inductor device, and the third side is different from the fourth side.

12. The inductor device of claim 11, wherein the third coil comprises a fifth half coil and a sixth half coil, the fourth coil comprises a seventh half coil and an eighth half coil, the fifth half coil and the seventh half coil are located on the third side of the inductor device, and the sixth half coil and the eighth half coil are located on the fourth side of the inductor device.

13. The inductor device of claim 12, wherein the first half coil and the fifth half coil are configured to transmit signals with same polarity.

14. The inductor device of claim 12, wherein the second half coil and the sixth half coil are configured to transmit signals with same polarity.

15. The inductor device of claim 12, wherein the third half coil and the seventh half coil are configured to transmit signals with same polarity.

16. The inductor device of claim 12, wherein the fourth half coil and the eighth half coil are configured to transmit signals with same polarity.

17. The inductor device of claim 12, wherein the first half coil, the fourth half coil, the fifth half coil and the eighth half coil are configured to transmit signals with same polarity.

18. The inductor device of claim 12, wherein the second half coil, the third half coil, the sixth half coil and the seventh half coil are configured to transmit signals with same polarity.

19. The inductor device of claim 1, wherein the first metal layer is different from the second metal layer, and a thickness of the second metal layer is smaller than a thickness of the first metal layer.

* * * * *